(12) United States Patent
Budalakoti (10) Patent No.: US 11,868,346 B2
(45) Date of Patent: Jan. 9, 2024

(54) AUTOMATED LINEAR CLUSTERING RECOMMENDATION FOR DATABASE ZONE MAPS

(71) Applicant: Oracle International Corporation, Redwood Shores, CA (US)

(72) Inventor: Suratna Budalakoti, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/138,830

(22) Filed: Dec. 30, 2020

(65) Prior Publication Data

US 2022/0207032 A1 Jun. 30, 2022

(51) Int. Cl.
  *G06F 16/24* (2019.01)
  *G06F 16/2453* (2019.01)
  *G06F 16/22* (2019.01)
  *G06F 16/28* (2019.01)

(52) U.S. Cl.
  CPC ........ *G06F 16/2453* (2019.01); *G06F 16/221* (2019.01); *G06F 16/2282* (2019.01); *G06F 16/285* (2019.01)

(58) Field of Classification Search
  CPC .................................................. G06F 16/2453
  USPC .......................................................... 707/713
  See application file for complete search history.

(56) References Cited

U.S. PATENT DOCUMENTS

| 5,899,986 | A | 5/1999 | Ziauddin |
| 6,223,171 | B1 | 4/2001 | Chaudhuri |
| 2004/0225639 | A1 | 11/2004 | Jakobsson et al. |
| 2006/0161517 | A1* | 7/2006 | Bhattacharjee ....... G06F 16/283 |
| 2013/0254196 | A1* | 9/2013 | Babu ..................... G06F 9/5066 |
| | | | 707/736 |
| 2014/0095502 | A1 | 4/2014 | Ziauddin et al. |
| 2014/0095520 | A1 | 4/2014 | Ziauddin et al. |
| 2018/0068008 | A1* | 3/2018 | Cruanes ............... G06F 16/211 |

(Continued)

FOREIGN PATENT DOCUMENTS

| WO | WO 2020/018718 | 1/2020 |
| WO | WO 2022/147237 A1 | 7/2022 |

OTHER PUBLICATIONS

Edjah, Nenya, "Zone Map Layout Optimization", Bachelor's thesis, Harvard College, https://dash.harvard.edu/bitstream/han dle/1/37364697/EDJAH-SENIORTHESIS-2020.pdf, dated May 2020, 55 pages.

(Continued)

*Primary Examiner* — Syling Yen
(74) *Attorney, Agent, or Firm* — Hickman Becker Bingham Ledesma LLP (57) ABSTRACT

Techniques to create zone maps automatically and efficiently for database query processing are disclosed. The techniques comprise creating a sample dataset to represent an original dataset, building a query workload modeler to characterize a full workload of queries, constructing a clustering quality evaluator to evaluate query performance on a dataset with a certain clustering on the columns, finding a clustering solution by evaluating different applications of the workload to the sample dataset corresponding to different clusterings, and determining which columns of the clustering solution could benefit from zone maps.

17 Claims, 3 Drawing Sheets

(56) References Cited

U.S. PATENT DOCUMENTS

2021/0382897 A1* 12/2021 Potharaju .......... G06F 16/24545

OTHER PUBLICATIONS

Bayliss, Nigel, "Optimizing Table Scans with Zone Maps", The Date Warehouse Insider, https://blogs.oracle.com/datawarehousing/post/optimizing-table-scans-with-zone-maps, dated Nov. 11, 2014, 8 pages.

Ziauddin et al., "Dimensions Based Data Clustering and Zone Maps", Proceedings of the VLDB Endowment, vol. 10, No. 12, pp. 1622-1633, http://www.vldb.org/pvldb/vol10/p1622-ziauddin.pdf, dated Aug. 2017, 12 pages.

Idreos et al., "Database Cracking", 3rd Biennial Conference on Innovative Data Systems Research (CIDR), vol. 7, pp. 68-78, dated Jan. 2007, 11 pages.

Wikipedia.com, "Z-Order Curve", https://en.wikipedia.org/wiki/Z-order_curve, last updated Sep. 2022, 8 pages.

Wikipedia.com, "Space-Filling Curve", https://en.wikipedia.org/wiki/Space-filling_curve, last updated Aug. 2022, 6 pages.

Snowflake.com, "Micro-Partitions & Data Clustering", Snowflake Documentation, https://docs.snowflake.com/en/user-guide/tables-clustering-micropartitions.html#clustering-information-maintained-for-micro-partitions, retrieved Oct. 2022, 7 pages.

Snowflake.com, "Clustering Keys & Clustered Tables", Snowflake Documentation, https://docs.snowflake.com/en/user-guide/tables-clustering-keys.html#strategies-for-selecting-clustering-keys, retrieved Oct. 2022, 15 pages.

Snowflake.com, "Automatic Clustering", Snowflake Documentation, https://docs.snowflake.com/en/user-guide/tables-auto-reclustering.html, retrieved Oct. 2022, 7 pages.

Oracle.com, "Using Zone Maps", Data Warehousing Guide, 12c Release, Chapter 13, https://docs.oracle.com/database/121/DWHSG/zone_maps.htm#DWHSG9357, dated 2017, 26 pages.

Oracle.com, "Attribute Clustering", Data Warehousing Guide, 12c Release, Chapter 12, https://docs.oracle.com/en/database/oracle/oracle-database/19/dwhsg/attribute-clustering.html#GUID-7B007A3C-53C2-4437-9E71-9ECECF8B4FAB, dated 2017, 12 pages.

IBM.com, "Zone Maps", IBM Documentation, PureData System for Analytics, 7.2.1, https://www.ibm.com/docs/en/psfa/7.2.1?topic=statistics-zone-maps, last updated Apr. 2022, 1 page.

Claes, Jef, "Amazon Redshift—Fundamentals", https://s3-eu-west-1.amazonaws.com/cdn.jefclaes.be/amazon-redshift-fundamentals/aws-redshift-fundamentals.html, retrieved Oct. 2022, 28 pages.

"Amazon Redshift Database Developer Guide", https://web.archive.org/web/20180608125513if_/https://docs.aws.amazon.com/redshift/latest/dg/redshift-dg.pdf, retrieved Apr. 10, 2023, see section "Choosing Sort Keys", Jun. 8, 2018, 400pgs.

* cited by examiner

AUTOMATED LINEAR CLUSTERING RECOMMENDATION FOR DATABASE ZONE MAPS

FIELD OF THE INVENTION

The techniques and approaches described herein, relate to the field of database zone maps, particularly automated and efficient generation of database zone maps.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Zone maps are a data access structure that reduce the cost of data access for a query by advance pruning of irrelevant data blocks. Zone maps are, however, most effective when the data in a database table is clustered in a way that is aligned with the workload query and data characteristics and zone maps are constructed for columns most relevant to the workload. It would be helpful to automatically analyze a workload and recommend zone maps to construct for best performance.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

Techniques to create zone maps automatically and efficiently for database query processing are disclosed. The techniques comprise creating a sample dataset to represent an original dataset, building a query workload modeler to characterize a full workload of queries, constructing a clustering quality evaluator to evaluate query performance on a dataset with a certain clustering on the columns, finding a clustering solution by evaluating different applications of the workload to the sample dataset corresponding to different clusterings, and determining which columns of the clustering solution could benefit from zone maps.

A database may include a plurality of more tables, and an original dataset can be obtained from one of those tables or from joining some of those tables. A brute-force approach of identify a clustering solution and the columns for building zone maps is to sort the original dataset on different sets of candidate columns, and running the full workload on the resulting sorted data for evaluation. However, in practice for large datasets, a single sort of the data could take hours. Therefore, the techniques disclosed in this application introduce a clustering quality evaluator, which takes a sample dataset created from the original dataset. The evaluator can sort the sample dataset on a candidate set of columns, and apply the resulting column clustering to the original dataset, thereby extrapolating performance on the sample dataset to performance on the original dataset. In addition, running the full workload comprising a number of queries on even the sample dataset could still be expensive, particularly when there are a large number of candidate clusterings to search through. To address this, the disclosed techniques introduce a query workload modeler, which builds a statistical model for the queries. By substituting sample dataset for the original dataset, and the query workload modeler for the full workload, it takes much less time to compare different clusterings and to determine the appropriate zone maps to create.

Zone Maps

Zone maps allow a database to prune data blocks containing rows irrelevant to a query predicate (e.g., the "equal to" operator in a where clause of a SQL statement) based on aggregate information, without having to actually visit these blocks. To construct a zone map, the entire table is divided into sized groups of row blocks, called zones. Then for each column of interest, the minimum and maximum value per zone is stored in a data structure. For an equality or range predicate of a query, a zone can be ignored if it has no overlap with the minimum to maximum range of the zone. The data structure containing the minimum and maximum value of each zone is called a zone map.

Zone maps work best for equality and range predicate queries and when the values in a zone are concentrated in a small subset of the column's range, such as when the column was sorted. For example, for a database column called 'State' representing US states, when the column is sorted, the minimum and maximum values of the first zone could be 'AK' and 'AZ' respectively, followed by 'CA' and 'DE', respectively for the second zone, and so on. For a query with an equality predicate: State='CA', when a zone map existed on this column, the database can use the zone map to determine that the database only needs to visit the second zone to access all relevant rows, and all the other data blocks can be pruned without accessing them.

However, a complete sort of the data is not required for zone maps to work well. As long as the values in a zone are within a particular range, they do not have to be sorted within the zone. To make this distinction, the term clustered is generally used in the context of zone maps, to identify columns where all values within a zone are within a certain minimum and maximum value. At present, most databases perform clustering by sorting the column, so there is no practical difference between sorted/sorting and clustered/clustering. In this application, the two terms are used interchangeably.

Linear Clustering

Most database tables have multiple columns that are important to queries, so sorting on a single column is usually not enough. An option for addressing this is to linearly cluster the table on multiple columns. Given a linear clustering Linear(T.A, T.B, T.C) on columns A, B, and C of table T, the database proceeds as follows: first the entire table is sorted on column A, followed by a sort on column B for keys that are tied in the values of column A, and then on column C for ties on columns A and B. In such cases, the system can expect the best performance for queries on column A, followed by column B, and then column C. For example, for a database table with two columns, State and Zip Code, with the following three rows: (TX,78712), (CA,94404), (CA, 94401), the linear sorted order would be: (CA,94401), (CA,94404), (TX,78712). This is because the rows were first sorted by State, and the two tied rows (where State='CA') were sorted by Zip Code.

General Approach

In some embodiments, for a database workload, namely a database instance populated with data, along with a set of representative queries on the data, a system identifies which columns of the database tables to cluster on and then which columns would benefit from a zone map given the identified clustering.

Figure 1:
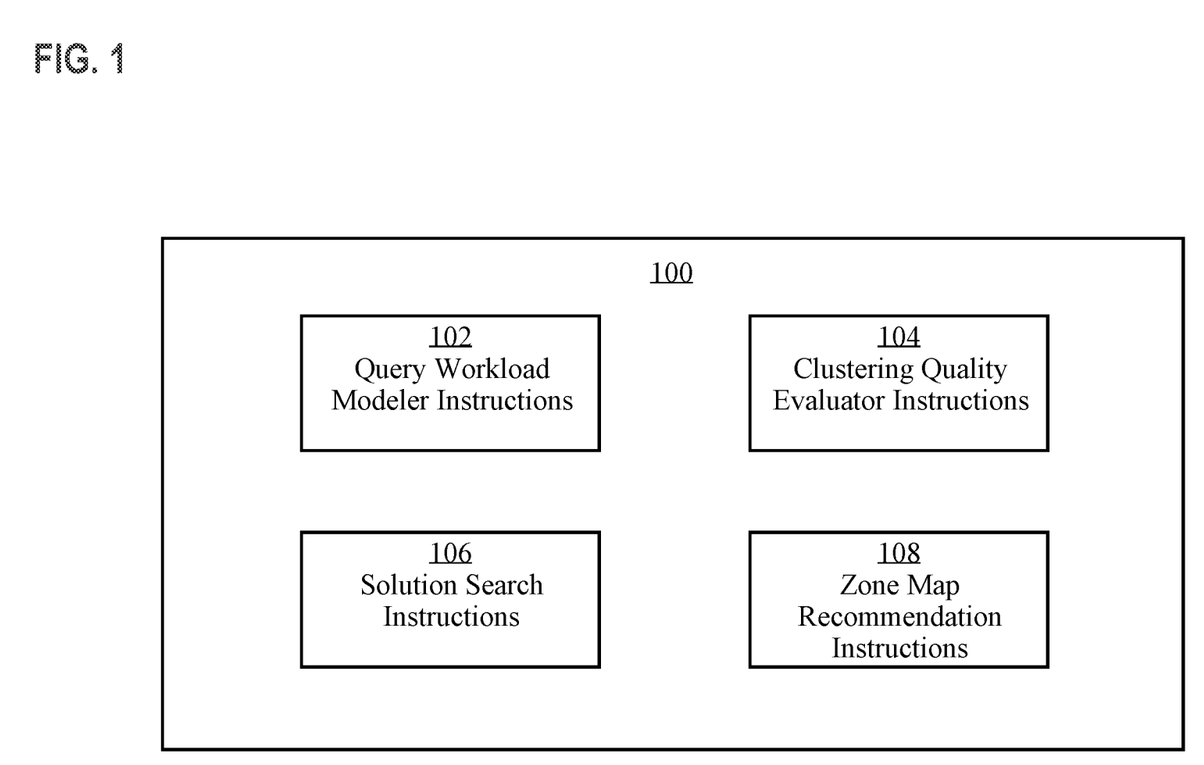
FIG. 1 illustrates example components a computer system according to the embodiments disclosed herein.

FIG. 1 illustrates example components a computer system according to the embodiments disclosed herein. In some embodiments, a database management system 100 comprises query workload modeler instructions 102, clustering quality evaluator instructions 104, solution search instructions 106, and zone maps recommendation instructions 108. In other embodiments, the system 100 can have more or fewer components.

In some embodiments, the query workload modeler instructions 102 enable column pruning and workload model creation. Column pruning comprises analyzing the queries in the workload to calculate weights for table columns based on how the columns are used in the queries and identify candidate columns for a clustering based on the weights. Workload model creation comprises creating a probabilistic model for the workload queries. This model includes information regarding the importance and additional query predicate characteristics for each column, such as selectivity, as further discussed below.

In some embodiments, the clustering quality evaluator instructions 104 enable taking a sample of the rows comprising the candidate columns from an original dataset. The clustering quality evaluator instructions 104 further enable building a clustering quality evaluator to evaluate the quality of a clustering in terms of query performance, executing the clustering quality evaluator on the sample set of rows that have been clustered using a specific clustering to obtain a quality score for the specific clustering, and extrapolating that quality score for the full set of rows in the original dataset.

In some embodiments, the solution search instructions 106 enable using a greedy algorithm to search through the space of possible clusterings to find an optimal clustering as a clustering solution. The search comprises executing the clustering quality evaluator on the sample set of rows that have been clustered using each clustering in the space.

In some embodiments, the zone maps recommendation instructions 108 enable identifying columns from the candidate columns for which to create zone maps. These would be columns for which, as given a clustering, the query performance deteriorates significantly in the absence of zone maps.

Column Pruning

In some embodiments, one factor to consider in deciding whether clustering on a column would be useful is column importance $w_c$ indicating how often a column is referenced in the queries. Only columns that feature in a significant portion of the query predicates should be included in the clustering solution. Therefore, columns that do not feature in at least a certain percentage of the queries in the workload are removed for further consideration. For example, the percentage can be 10%.

In some embodiments, for the columns that have not been pruned out, a weight is calculated, which can depend on the particular database schema used. Another factor to consider in deciding whether a clustering on a column would be useful is query selectivity. It is better to cluster on a column for which queries are highly selective, namely when the query predicates refer to a relatively small number of values in the column. The weights for the columns can be based on the query selectivity. For example, a weight for a column could indicate how likely it is that the column is the most selective column in a query. Some databases produce such information in generating a query plan. Otherwise, the weights can be calculated from a random sample of the database rows in terms of the percentage of queries in the workload for which a column is the most selective. In other embodiments, the weights for the columns can be based on just column importance. For example, a weight for a column can simply be the percentage of queries in the workload that have a predicate on the column. The weights can be normalized to sum to one and treated as a probability distribution.

Workload Model Creation

In some embodiments, yet another factor to consider in deciding whether a clustering on a column would be useful is the number of OR terms in the queries on a column. When queries on a column are a union of a large number of equality predicates, which require random access to the database, zone maps are often not useful even when the data is sorted.

In some embodiments, a heterogeneity value with respect to a query predicate is computed for a column, which is defined as the frequency distribution of number of distinct values (NDV) observed in a single query predicate on the column. For example, the query predicate "Where state='CA' or state='TX' or state='WA'" has an NDV of 3. The heterogeneity value is a characteristic of the queries instead of the data. Usually this value can be extracted from the query text or the query plan. Formally, heterogeneity $h_c$ is represented as a set of pairs for column c, $h_c = d_c^i, f_c^i$, where $d_c^i$ is a distinct value of NDV observed in a predicate i for the column, and $f_c^i$ is the normalized frequency with which the predicate value is observed.

An additional factor to consider in deciding whether a clustering on a column would be useful is the relationship of the column with other columns. The relationship has an impact on the quality of a clustering. For example, the two columns Zip Code and State are not statistically independent. When the data is clustered on Zip Code, the data is automatically clustered on State. As a result, clustering on one column (Zip Code) can lead to useful zone maps on two columns (Zip Code and State), without having to specifically cluster on State. For further example, the two columns State and Name are likely to be statistically independent. As a result, clustering on only one of these columns will not be sufficient. Also, since names can be close to unique, linearly clustering on (Name, State) would essentially leave State unclustered. In comparison, clustering on (State, Name) is likely to give better performance. The use of a clustering for constructing zone maps, which include minimum and maximum values for each zone, inherently captures the relationship among columns.

In some embodiments, a workload is thus modeled, through the effect of the queries on the columns, as a set of 3-tuples: $Q=(m_c, w_c, h_c)$, $c=1 \ldots n_c$, where $n_c$ is the number of columns of interest, $m_c$ is the name of the cth column, $w_c$ is its weight, and $h_c$ is the aggregate heterogeneity value over the predicates on the column. The workload model of the set of 3-tuples can also be viewed a simplified probabilistic model of how queries are generated based on the dataset. At each step, a database column is selected, where the probability that column c is selected is $w_c$. Following this, a query is created for the selected column with a certain number of predicates. The number of predicates follows the distribution $h_c$, so that the probability that the $d_c^i$ predicate value is generated is $f_c^i$. All distinct values in the column are equally likely to be selected as predicate values.

Clustering Quality Evaluator

In some embodiments, a materialized row sample of the candidate columns obtained from the original dataset is then analyzed to calculate the best clustering, and also to identify the zone map columns. The rows for the sample dataset can be selected randomly using a sampling factor, such as 0.1% or 0.2%. The sampling factor can be selected experimentally so that the minimum and maximum values observed in a zone of the sample dataset is reasonably close (e.g., more than 10% different in fewer than 10% of the trials) to the actual minimum and maximum values.

In some embodiments, the quality of a clustering solution is estimated as the expected (average) number of zones visited for a randomly chosen query from the workload. The estimation is performed with respect to the original dataset. The result can then be extended to estimate clustering quality with respect to the sample dataset with some simplifying assumptions.

Clustering Quality Given an Original Dataset

In some embodiments, for an original data set having rows of data for at least a set of columns on which the rows have been clustered and zone maps have been constructed, the estimation problem can be formalized as follows. Let $A_Q$ be a random variable representing the number of accesses to a table when a workload Q is executed. The objective is to calculate $E[A_Q]$, the expected number of accesses given one randomly generated query from Q. As discussed above, the workload Q is modeled as a probability distribution over columns, where the probability of a query on a column is proportional to its weight $w_c$. Therefore, $E[A_Q]$ can be calculated as:

$$E[A_Q] = \sum_{c \in Q} w_c E[A_c] \qquad (1)$$

Here $E[A_c]$ is the expected number of zone accesses for a query on column c. Next, let Z be the set of zones, with the assumption that a zone map exists for all candidate columns. For a zone $z_j \in Z$, let $l_{jc}$ be an indicator function representing the event that a random query on column c (from the workload) would access zone $z_j$. The objective is to calculate $E[A_c] = E[\Sigma_{z_j \in Z} l_{jc}]$. Therefore, $$E[A_c] = \sum E[l_{jc}] \qquad (2)$$

The expected number of accesses to a single zone can then be calculated and such expected numbers can be summed across all zones, to calculate the expected number of zones visited. As the expected number of visits to a single zone for a query is always less than 1, this expected number of zones visited is essentially the probability that the zone is accessed.

For a single zone $z_j \in Z$, for which minimum and maximum values for column c are known, the minimum and maximum value for a zone $z_c^j$ can be written as $\min(z_c^j)$ and $\max(z_c^j)$, respectively. A function NDV distance $V^c(x, y)$, is next defined, which given two distinct values x and y from a column c, returns the number of distinct values that lie between x and y in sorted order. For example, for a column s that contains all 50 states, $V^c(\text{'CA'}, \text{'FL'})=5$, including the following set of states: 'CA', 'CO', 'CT', 'DE', and 'FL'. This function returns only the number of distinct values between two given values, and is not impacted by the frequency with which each value occurs. Then $E[l_{jc}]=P[l_{jc}=1]$ is calculated as:

$$E[l_{jc}] = \sum_{(d_c^i, f_c^i) \in h_c} f_c^i \left[ 1 - \left( \frac{V^c(\min(z_c^j), \max(z_c^j))}{NDV_c} \right)^{d_c^i} \right] \qquad (3)$$

In the above equation, $NDV_c$ represents the actual NDV of column c. Also, the summation on the right-hand-side is over all possible predicate values $d_c^j$, weighed by their respective probability ($f_c^j$). Specifically, the probability that a query will access a zone $z_j$ is 1 minus the probability that none of the $d_c^j$ keys in the query appear in the zone. The probability that a randomly chosen key does not appear in a zone is given by $$1 - \frac{V^c(\min(z_c^j), \max(z_c^j))}{NDV_c}.$$

Assuming the keys are chosen randomly, and all keys are equally likely to be chosen, this value is raised to the power of $d_c^j$ to give the probability that none of randomly chosen $d_c^j$ keys appears in the zone.

Equation (3) represents the expected number of accesses to a single zone for one randomly generated query on a randomly chosen column. To calculate the total expected number of zones accessed for a random query, Equation (3) can be used to calculate the expected number of accesses to each zone, for each column. Such expected numbers are then summed across all zones using Equation (2) to calculate $E[A_c]$, the total expected number of zones accessed for each column. A weighted sum across all columns using Equation (1) can then be used to calculate the expected number of zones accessed, for a randomly chosen column from the workload.

Extension to Clustering Quality Given a Sample Dataset

In some embodiments, to estimate $E[A_Q]$ based on a sample dataset of the original dataset, the size of each zone can be scaled down based on a sampling percentage. For an original table zone size of Sz rows, and a sampling percentage p, we set the zone size on the sample to $$\frac{p}{100} * S_Z.$$

Scaling down the zone size in this manner actually gives us an unbiased estimate of the endpoints ($\min(z_c^j)$ and $\max(z_c^j)$) of each zone.

In some embodiments, with simplifying assumptions, $$\frac{V^c(\min(z_c^j), \max(z_c^j))}{NDV_c}$$

in Equation (3) can be estimated from the sample dataset. These assumptions include seeing only $k*NDV_c$ distinct keys in the sample dataset, where k is a fraction that is constant across zones. Then, an estimate of this term based on the sample dataset is an unbiased estimate of this term for the entire dataset, as the k term cancels out. This can be seen as follows:

$$\frac{k \cdot V^c(\min(z_c^j), \max(z_c^j))}{k \cdot NDV_c} = \frac{V^c(\min(z_c^j), \max(z_c^j))}{NDV_c}$$

The left-hand-side term is the one observed in the sample (though k in not known), while the right-hand-side term is the ground truth. The aforementioned assumptions mean that the keys missing from the sample dataset are distributed across zones in proportion to the zone's sample NDV. With these assumption, Equations (3), (2), and (1) can be used over the sample dataset to estimate the quality of a clustering.

In some embodiments, another assumption made is that instead of a distribution, the heterogeneity of a column's predicate can be represented by the mean number of terms combined with operators in the predicate, $\overline{d_c}$=mean of all $d_c^j$. This is a reasonable assumption when the predicate heterogeneity is concentrated on a single value. A related assumption is that all queries on a column have exactly one predicate. Equations (3), (2), and (1) can be combined into a single equation:

$$E[A_Q] = \Sigma_{c \in Q} w_c E[A_c] \quad (4)$$

$E[A_c]$ can be approximated as:

$$E[A_c] \approx \sum_{z_j \in Z} \left(1 - \left(1 - \frac{V^c(\min(z_c^j), \max(z_c^j))}{NDV_c}\right)^{\overline{d_c}}\right) \quad (5)$$

Equation (4) can be written as:

$$\Rightarrow E[A_Q] \approx \sum_{c \in Q} w_c \left[\sum_{z_j \in Z} \left(1 - \left(1 - \frac{V^c(\min(z_c^j), \max(z_c^j))}{NDV_c}\right)^{\overline{d_c}}\right)\right] \quad (6)$$

The key change between this equation and Equation (3) is that, instead of summing over all possible values of NDV in a query predicate, only the mean value $\overline{d_c}$ is used.

In some embodiments, quick evaluation of Equation (6) can be facilitated by efficient performance of the following two steps. The first step is to find the minimum and maximum value of each (scaled down) zone for each column, $\min(z_c^j)$ and $\max(z_c^j)$. This can be implemented efficiently using the SQL row_number( ) function. For example, to find the minimum and maximum values for all zones for a column $col, based on clustering columns $cluster_cols, the following SQL query can be executed:

```
with SAMPLE_TABLE_rn as (
Select row_number( ) over (order by $cluster_cols) rn,
SAMPLE_TABLE.* from SAMPLE_TABLE
)
Select min($col), max($col) from SAMPLE_TABLE_rn group
by trunc((rn-1)/$zonemap_size);
```

The query optimizer of a database ensures that this query runs quickly and efficiently. The second step is to find, in the sample dataset, the number of distinct values between two given values (inclusive) for any column, $V^c(\min(z_c^j), \max(z_c^j))$. This can be accomplished by creating temporary tables with distinct values of all columns in sorted order, or by creating temporary indices on the sample dataset. Since this step is performed on the sample dataset and is required only once as pre-processing (after which the tables can be reused for all calls to this function), this step is relatively inexpensive.

Solution Search Algorithm

In some embodiments, the clustering solution from which zone maps are to be built can be found using a greedy approach. At each time-step, a linear clustering with the lowest expected number of zone accesses is generated by expanding the linear clustering from the previous time-step with an additional column. The greedy approach can be described in pseudocode as follows:

```
input: S: A sample with columns C = c₁, . . . , nc
        τ: Maximum number of clustering columns allowed (default = 4)
        Δ: Minimum percentage improvement required for column
           inclusion (default = 5%)
output: A pair soln = (soln._1, solu._2), where soln._1
        is the list of clustering columns and soln._2 is the clustering
        quality.
Initialization:
1 Set candidate solution queue U ← φ
2 Set baseline_soln ← Expected_Num_Accesses(S, rowid)
3 Add pair (Ø, baseline_soln) to U
Loop:
4 do
5   Set cur_soln ← u ∈ U with smallest value of u._2
6   Set cur_quality ← cur_soln._2
7   Set cur_clus_cols ← cur_soln._1
8   Set new_sol_found ← False
9   for c ∈ C – cur_clus_cols do
10      Set new_cand_cols ← cur_clus_cols.append(c)
11      Set new_clus_quality ← Expected_Num_Accesses(S,
           new_cand_cols)
12      Set impr ← (cur_quality – new_clus_quality) / cur_quality
13      if impr > Δ then
14          Add (new_cand_cols, new_clus_quality) to U
15          Set new_soln_found ← True
16 while len(curr_soln.cols) < τ and new_soln_found
  Result:
17 Set soln ← u ∈ U with smallest value of u._2
18 return soln
```

In some embodiments, the function Expected_Num_Accesses(Sample, Candidate Cols) takes as input a sample and a set of candidate columns (starting with "rowid" denoting a pseudo column) to cluster on, and returns $E[A_Q]$, the expected number of zones visited by running the workload on the sample dataset to which a linear clustering based on the set of candidate columns applies, using Equation (6). When a new column c is added to a candidate clustering solution, at least $\min(z_c^j)$, $\max(z_c^j)$, and $V^C$ ($\min(z_c^j)$, $\max(z_c^j)$) might change accordingly. Apart from the input parameters, the function also has the following information related to the workload available to it:

1. The weight $w_c$ attached to each column.
2. The mean NDV $d_c^j$ of predicates on the column.

In some embodiments, execution of the greedy approach described above results in a clustering solution involving a set of candidate columns and an expected number of zone maps visited for a randomly chosen query given the clustering solution, assuming that zone maps exist for all candidate columns.

Zone Map Column Identification

In some embodiments, the list of candidate columns is pruned, where columns that do not have a significant impact on $E[A_Q]$ are removed. When a zone map exists on column c, the expected number of zone accesses $E[A_c]$ for queries on c is given by Equation (5). When no zone map exists on a column, all zones will be accessed for queries on the column, so $E[A_c]=N_z$, the number of zones in the table, which can be used as a baseline for determining the impact of zone maps for a column on $E[A_Q]$.

In some embodiments, the function Expected_Num_Accesses returns a vector $\vec{A_c}$ instead of $E[A_Q]$, where the cth element of this vector is $E[A_c]$. $\vec{A_c}$ is the input to Equation (4). Then the impact of not creating a zone map on column c can be calculated as follows: replace $E[A_c]$ with $N_z$ in $\vec{A_c}$, and recalculate $E[A_Q]$ using Equation (4). This recalculated value is denoted as $E[A_Q|\neg c]$. Then the impact of the zone map on column c can be calculated as:

$$Impact_c = \frac{E[A_Q | \neg c] - E[A_Q]}{E[A_Q]} * 100$$

$Impact_c$ is thus the percentage increase in total zone map accesses, when a zone map is not created on c. A final list of columns where the impact of zone maps is above a certain threshold is selected, and zone maps are created only for this final list of columns. In some embodiments, the impact threshold is set to 5%.

Example Processes

Figure 2:
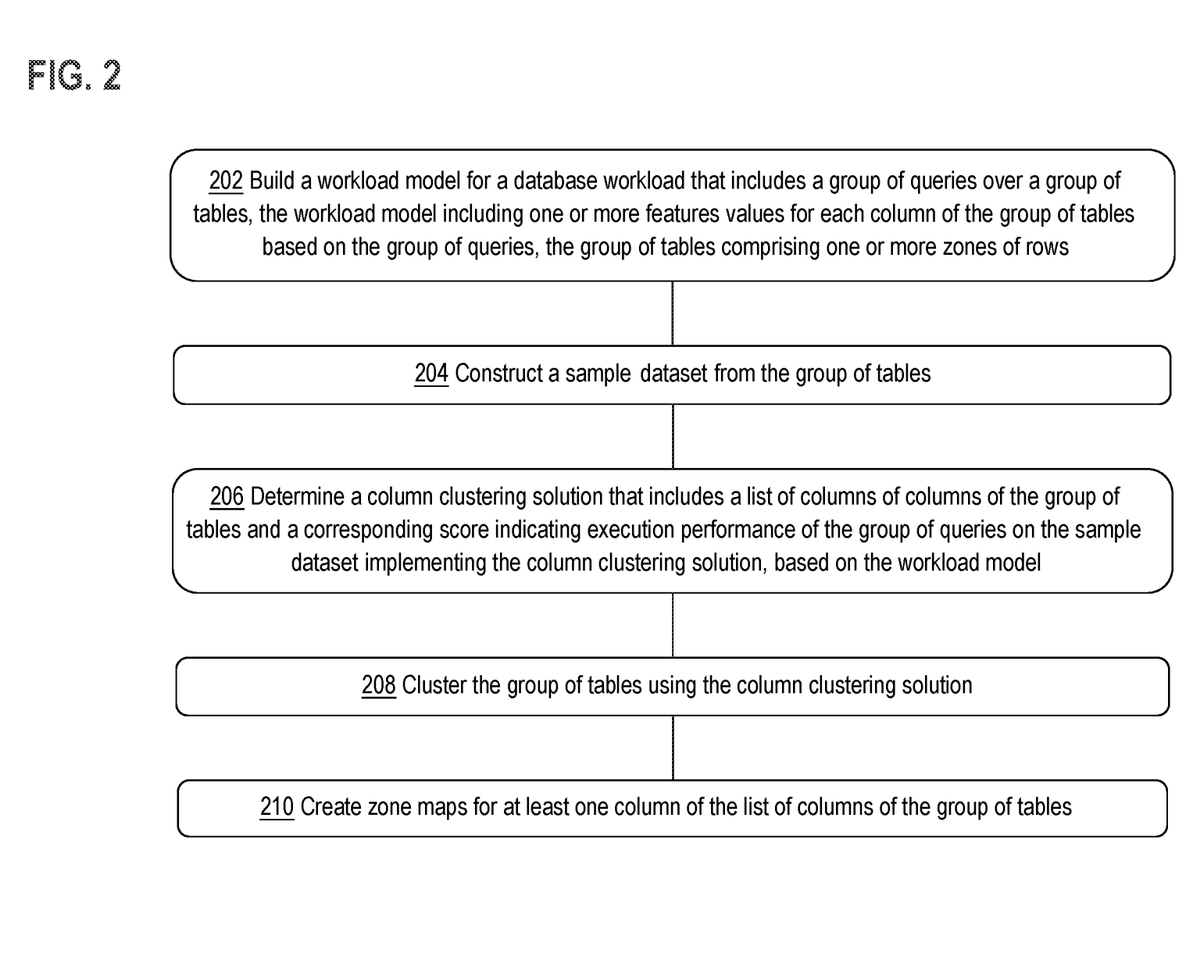
FIG. 2 illustrates a process of recommending zone maps for database tables in a flowchart according to embodiments disclosed herein.

FIG. 2 illustrates a process of recommending zone maps for database tables in a flowchart according to the embodiments disclosed herein.

At block 202, a system builds a workload model for a database workload that includes a group of queries over a group of tables. The group of tables comprises one or more zones of rows. The workload model includes one or more features values for each column of the group of tables based on the group of queries.

In some embodiments, the one or more feature values for a column including an importance value indicates how often the group of queries reference the column or how selective the group of queries are on the column. In other embodiments, the one or more feature values for a column including a heterogeneity value indicates how many predicate values the group of queries have on the column on a per-query basis.

At block 204, the system constructs a sample dataset from the group of tables. In some embodiments, the constructing comprises sampling rows in the group of tables with a sampling factor.

At block 206, the system determines a column clustering solution that includes a list of columns of columns of the group of tables and a corresponding score indicating execution performance of the group of queries on the sample dataset implementing the column clustering solution, based on the workload model. In some embodiments, the column clustering solution being a linear column clustering.

In some embodiments, the system selects a group of columns from the columns of the group of tables by applying a threshold to the importance value of each column and determines the column clustering solution from only the group of columns.

In some embodiments, determining the column clustering solution comprises greedily building the column clustering solution by identifying one more column to cluster in each iteration.

In some embodiments, determining the column clustering solution comprises, in each iteration, calculating a score corresponding to adding each candidate column to a current column clustering to form an enhanced column clustering, the score being related to a number of accesses to the sample dataset implementing the enhanced column clustering, based on the workload model.

In some embodiments, in further determining the column clustering solution, the system identifies a specific enhanced column clustering that corresponds to a highest score among all enhanced column clusterings and computes a difference between a score corresponding to the current column clustering and the highest score. When the difference is greater than a threshold, the system identifies the specific enhanced column clustering as the column clustering solution; when the difference is no greater than the threshold, the system starts another iteration.

In some embodiments, determining the column clustering solution comprises computing a number of accesses to the sample dataset based on zone maps or a number of distinct values for each of the list of columns.

At block 208, the system clusters the group of tables using the column clustering solution.

At block 210, the system creates zone maps for at least one column of the list of columns of the group of tables.

In some embodiments, the system further computes an impact value for each column of the list of columns indicating a reduction in execution performance of the group of queries on the sample dataset in an absence of zone maps for the column and creates zone maps for the at least one column that exclude a column having an impact value below a threshold.

In some embodiments, computing the impact value for the column comprises calculating a difference between a first number of accesses to the sample dataset implementing the column clustering solution, based on the workload model without zone maps for the column and a second number of accesses to the sample dataset with zone maps for the column.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
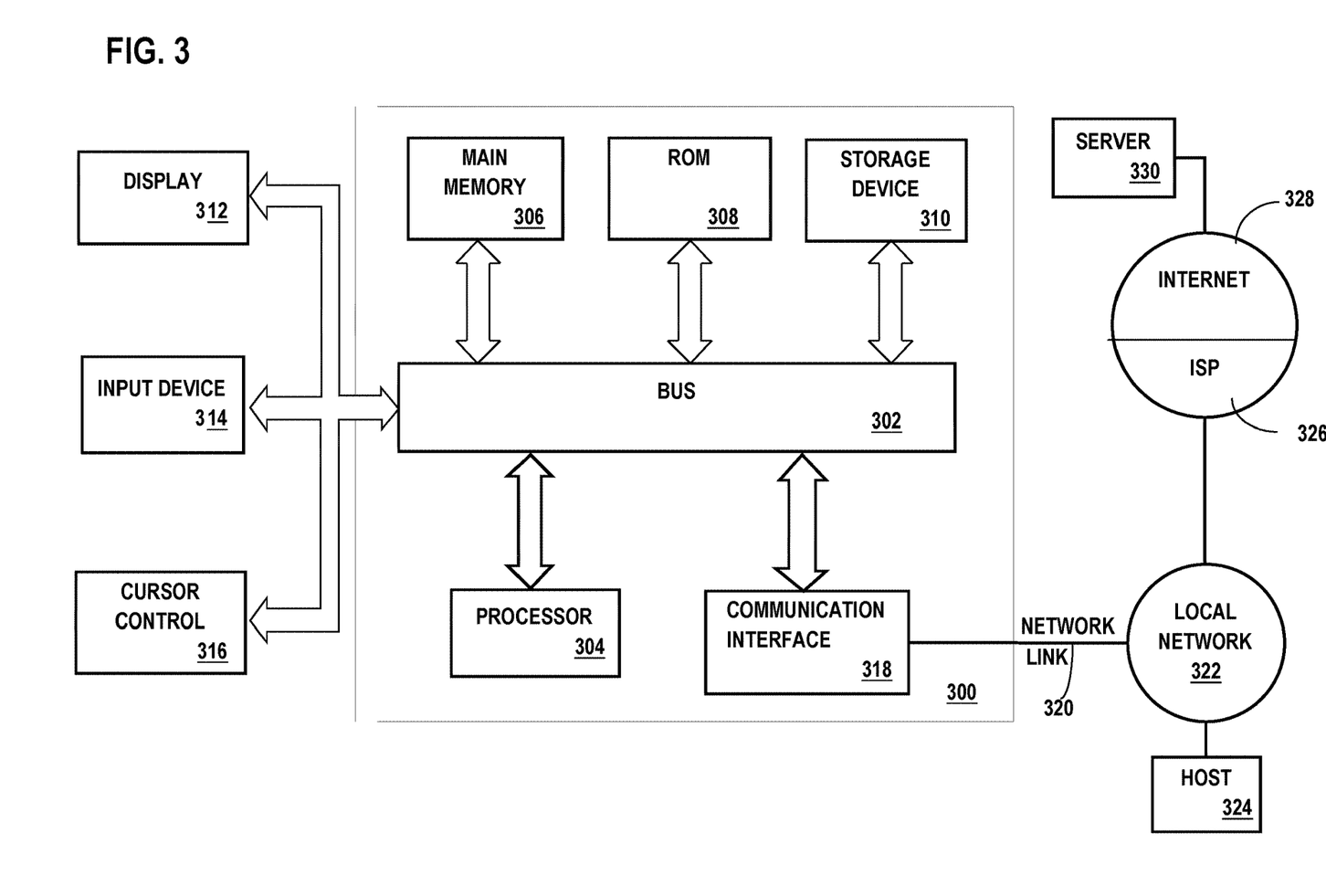
FIG. 3 is a block diagram that illustrates a computer system upon which an embodiment of the approach may be implemented.

For example, FIG. 3 is a block diagram that illustrates a computer system 300 upon which an embodiment of the approach may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database management system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database management system 100, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer-implemented method, comprising:
   building a probabilistic workload model for a database workload that includes a group of queries over a group of tables,
      the probabilistic workload model including a probability and one or more feature values for each column of the group of tables based on the group of queries,
      the group of tables comprising one or more zones of rows;
   constructing a sample dataset of rows from the group of tables;
   selecting a column clustering solution that includes a list of columns of columns of the group of tables based on a corresponding score indicating execution performance of the group of queries based on zone maps on the sample dataset implementing the column clustering solution, using the probabilistic workload model;
   clustering the group of tables using the column clustering solution;
   creating zone maps for at least one column of the list of columns of the group of tables;
   a database management system executing a query, wherein executing a query includes pruning sets of rows irrelevant to the query based on the zone maps; and
   computing an impact value for each column of the list of columns by calculating a difference between a first number of accesses to the sample dataset implementing the column clustering solution based on the probabilistic workload model without zone maps for the column and a second number of accesses to the sample dataset with zone maps for the column.

2. The computer-implemented method of claim 1, the one or more feature values for a column including an importance value indicating how often the group of queries reference the column or how selective the group of queries are on the column.

3. The computer-implemented method of claim 2, further comprising
   determining a group of columns from the columns of the group of tables by applying a threshold to the importance value of each column of the group of tables,
   the selecting being performed from only the group of columns.

4. The computer-implemented method of claim 1, the one or more feature values for a column including a heterogeneity value indicating how many predicate values the group of queries have on the column on a per-query basis.

5. The computer-implemented method of claim 1, the constructing comprising sampling rows in the group of tables with a sampling factor.

6. The computer-implemented method of claim 1, the column clustering solution being a linear column clustering.

7. The computer-implemented method of claim 1, the selecting comprising greedily building the column clustering solution by identifying one more column to cluster in each iteration.

8. The computer-implemented method of claim 1, the selecting comprising, in each iteration, calculating a score corresponding to adding each candidate column to a current column clustering to form an enhanced column clustering, the score being related to a number of accesses to the sample dataset implementing the enhanced column clustering, based on the probabilistic workload model.

9. The computer-implemented method of claim 8, the selecting comprising:
   identifying a specific enhanced column clustering that corresponds to a highest score among all enhanced column clusterings;
   computing a difference between a score corresponding to the current column clustering and the highest score;
   when the difference is greater than a threshold, identifying the specific enhanced column clustering as the column clustering solution;
   when the difference is no greater than the threshold, starting another iteration.

10. The computer-implemented method of claim 1, the selecting comprising computing a number of accesses to the sample dataset based on zone maps or a number of distinct values for each of the list of columns.

11. A non-transitory, computer-readable storage medium storing instructions which, when executed cause one or more computing devices to perform a method, the method comprising:
   building a probabilistic workload model for a database workload that includes a group of queries over a group of tables,
      the probabilistic workload model including a probability and one or more feature values for each column of the group of tables based on the group of queries,
      the group of tables comprising one or more zones of rows;
   constructing a sample dataset of rows from the group of tables;
   selecting a column clustering solution that includes a list of columns of columns of the group of tables based on a corresponding score indicating execution performance of the group of queries based on zone maps on the sample dataset implementing the column clustering solution, using the probabilistic workload model;
   clustering the group of tables using the column clustering solution;
   creating zone maps for at least one column of the list of columns of the group of tables; and
   a database management system executing a query, wherein executing a query includes pruning sets of rows irrelevant to the query based on the zone maps; and
   computing an impact value for each column of the list of columns by calculating a difference between a first number of accesses to the sample dataset implementing the column clustering solution based on the probabilistic workload model without zone maps for the column and a second number of accesses to the sample dataset with zone maps for the column.

12. The non-transitory, computer-readable storage medium of claim 11, the one or more feature values for a column including an importance value indicating how often the group of queries reference the column or how selective the group of queries are on the column.

13. The non-transitory, computer-readable storage medium of claim 11, the one or more feature values for a column including a heterogeneity value indicating how many predicate values the group of queries have on the column on a per-query basis.

14. The non-transitory, computer-readable storage medium of claim 11, the selecting comprising greedily building the column clustering solution by identifying one more column to cluster in each iteration.

15. The non-transitory, computer-readable storage medium of claim 11, the selecting comprising, in each iteration, calculating a score corresponding to adding each candidate column to a current column clustering to form an enhanced column clustering, the score being related to a number of accesses to the sample dataset implementing the enhanced column clustering, based on the probabilistic workload model.

16. The non-transitory, computer-readable storage medium of claim 15, the selecting comprising:
   identifying a specific enhanced column clustering that corresponds to a highest score among all enhanced column clusterings;
   computing a difference between a score corresponding to the current column clustering and the highest score;
   when the difference is greater than a threshold, identifying the specific enhanced column clustering as the column clustering solution;
   when the difference is no greater than the threshold, starting another iteration.

17. The non-transitory, computer-readable storage medium of claim 11, the selecting comprising computing a number of accesses to the sample dataset based on zone maps or a number of distinct values for each of the list of columns.

* * * * *